Figure 1:
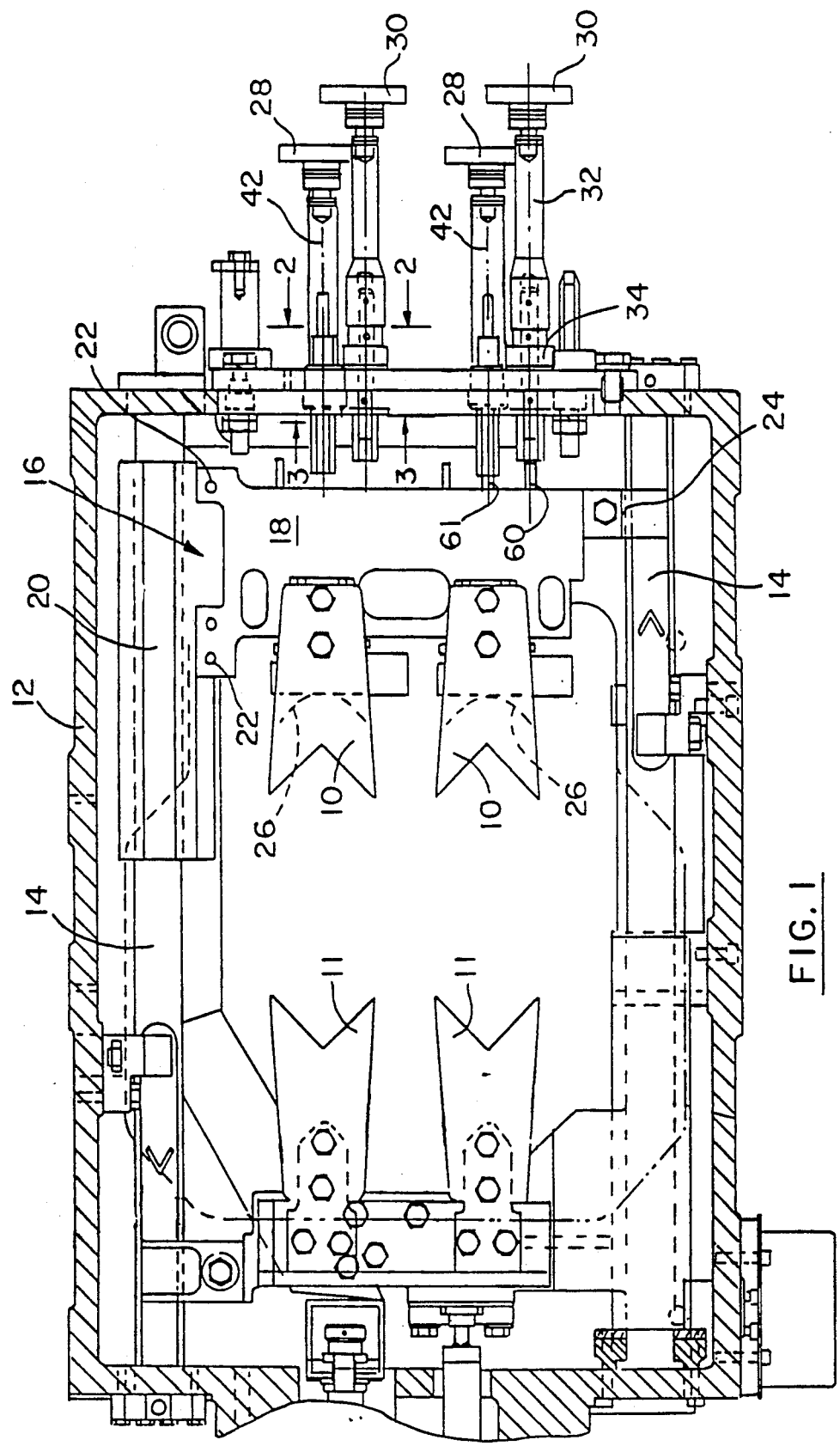

United States Patent [19]

Tintle

[11] Patent Number: 5,189,938
[45] Date of Patent: Mar. 2, 1993

[54] SHEAR MECHANISM HAVING QUICK CHANGE DROP GUIDE

[75] Inventor: William C. Tintle, Waterford, Conn.

[73] Assignee: Emhart Glass Machinery Investments Inc., Wilmington, Del.

[21] Appl. No.: 814,744

[22] Filed: Dec. 24, 1991

[51] Int. Cl.[5] ............................................. C03B 7/10
[52] U.S. Cl. ........................................ 83/623; 83/698; 83/700; 65/334
[58] Field of Search ............... 83/150, 162, 600, 618, 83/620, 623, 694, 698, 700; 65/133, 303, 332, 334

[56] References Cited

U.S. PATENT DOCUMENTS

| | | | |
|---|---|---|---|
| 3,579,319 | 5/1971 | Wythe et al. | 83/700 X |
| 4,214,497 | 7/1980 | Dahms | 83/640 |
| 4,791,845 | 12/1988 | Wright | 83/150 |
| 4,924,740 | 5/1990 | Wright | 83/527 |

Primary Examiner—Eugenia Jones
Attorney, Agent, or Firm—Spencer T. Smith

[57] ABSTRACT

A shear mechanism having at least one shear. Each shear has an associated drop guide which can be displaced relative to the shear. The drop guide is secured in position from the front and when release, it can be pulled forwardly and separated from its support for replacement or repair.

3 Claims, 5 Drawing Sheets

SHEAR MECHANISM HAVING QUICK CHANGE DROP GUIDE

Glassware is conventionally manufactured in an individual section (I.S.) machine. Such a machine has a plurality of individual sections which may receive one, two, three or four discrete gobs of molten glass and form them into the finished ware (glass bottles, for example).

The gobs are severed from runners which descend vertically from a feeder by a pair of shear blades which are arranged one over the other. The lower blade has a tendency of pushing the top portion of the severed gob towards the other side of the mechanism thereby forming a banana shaped gob and this is undesirable. To minimize this problem, a gob drop guide is utilized to limit such bending of the gob. U.S. Pat. Nos. 4,214,497 and 4,791,845 disclose drop guide mechanisms.

Molten glass, being formed from sand, is very abrasive and drop guides accordingly will be abrasively attacked by the guided gob and periodically must be replaced.

It is an object of the present invention to provide a quick change gob drop guide assembly which will permit quick changing for repair or replacement.

Other objects and advantages of the present invention will become apparent from the following portion of this specification and from the accompanying drawings which illustrate in accordance with the mandate of the patent statutes a presently preferred embodiment incorporating the principles of the invention.

Figure 3:
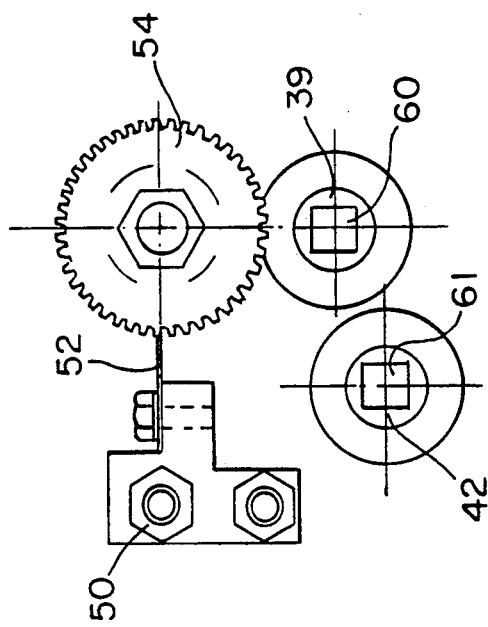
Figure 2:
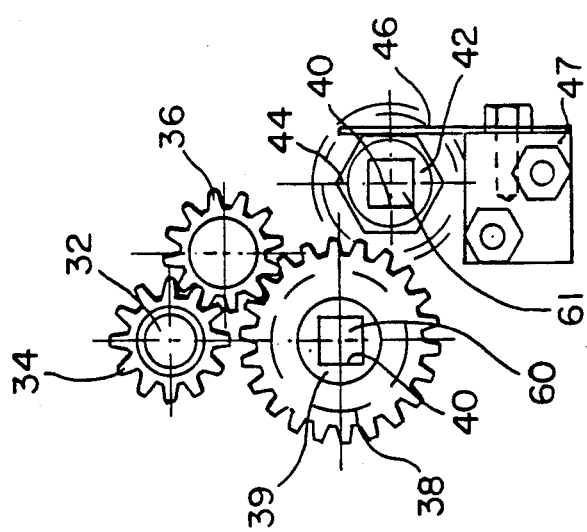
Figure 4:
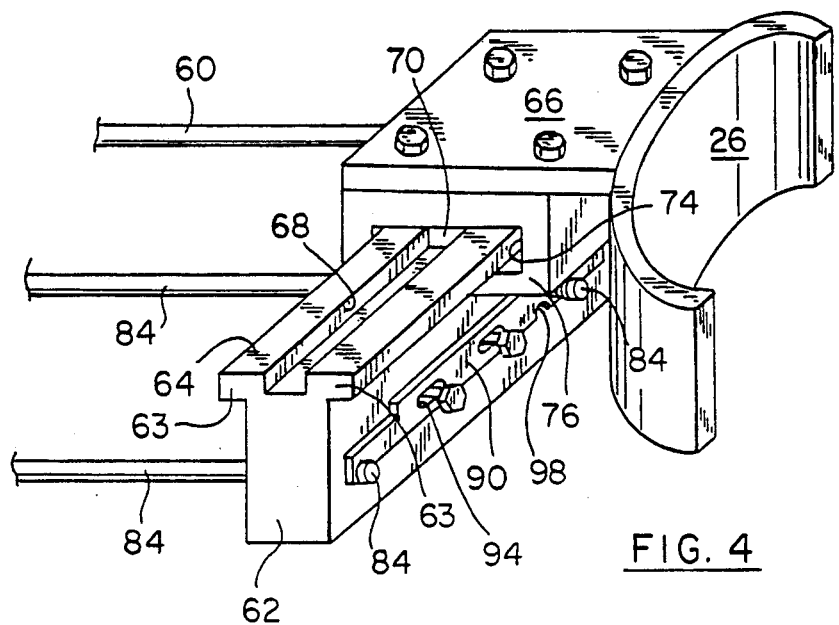
Figure 7:
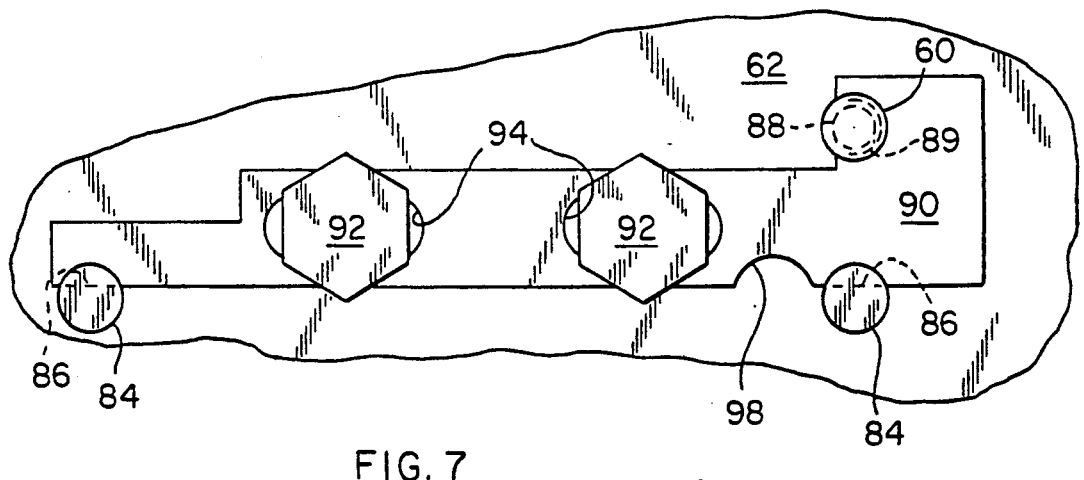
Figure 5:
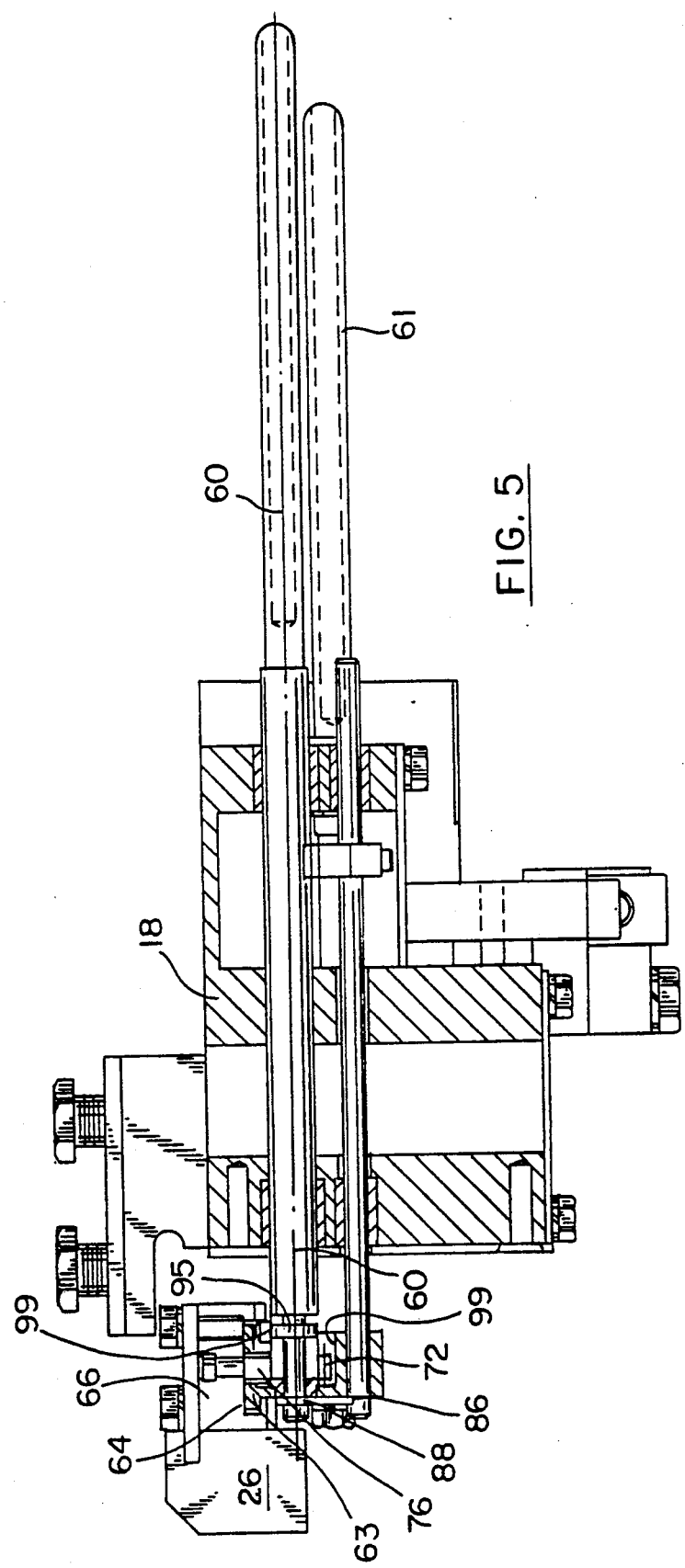
Figure 6:
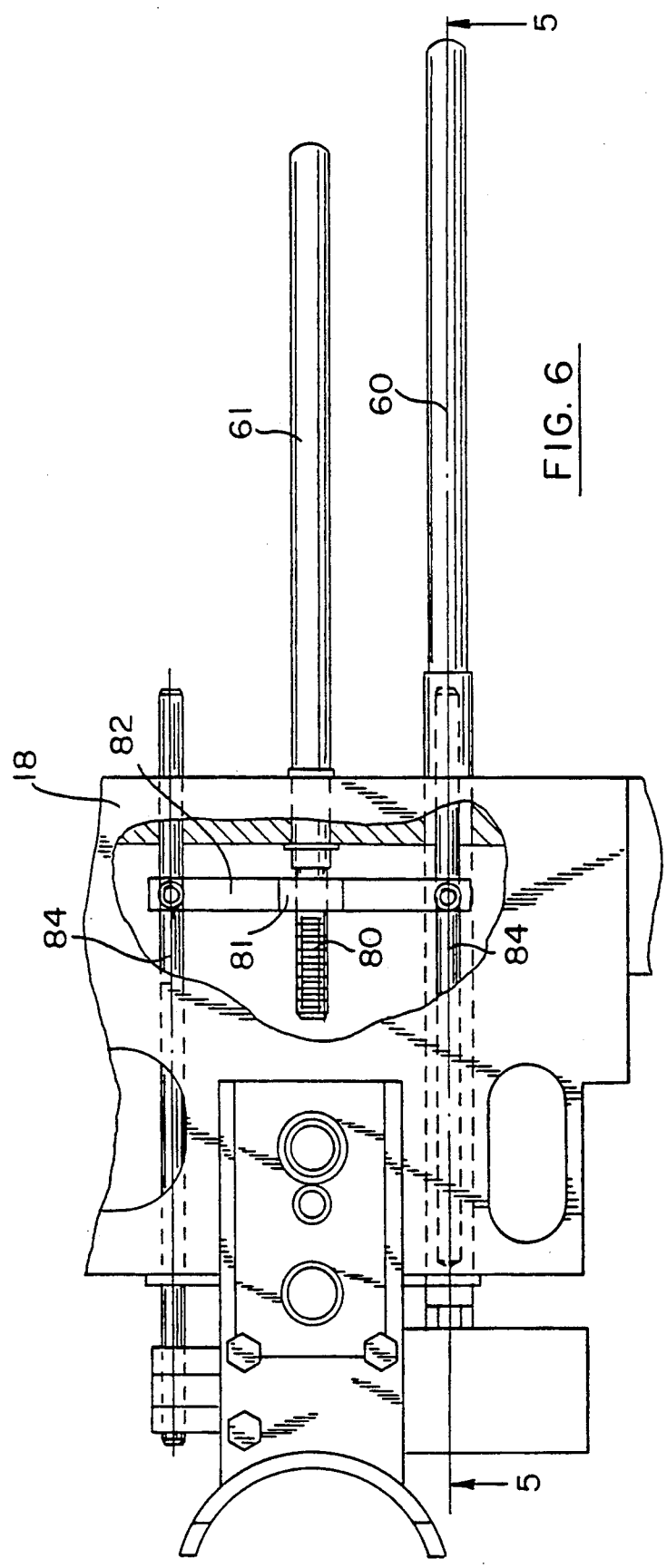

Referring to the drawings:

FIG. 1 is a top view of a portion of a shear mechanism made in accordance with the teachings of the present invention; and FIG. 2 is a view taken at 2—2 of FIG. 1;
FIG. 3 is a view taken at 3—3 of FIG. 1;
FIG. 4 is an oblique view of a drop guide;
FIG. 5 is a view taken at 5—5 of FIG. 6;
FIG. 6 is an enlarged view of a portion of FIG. 1, with the shear removed; and
FIG. 7 is a front view of the drop guide connecting plate.

The shear mechanism has pairs (in the preferred embodiment) of opposed upper 10 and lower 11 shears which are supported within a frame 12 for reciprocating displacement. A pair of guide shafts 14 extend along either side of the frame and slidably support the upper blade assembly 16 which includes a shear assembly housing 18 and an elongated tubular guide shaft support 20. The housing 18 is secured at one side via screws 22 to the guide shaft support 20 and is clamped 24 at the other end to one of the guide shafts 14.

Associated with each upper shear blade 10 is a drop guide 26. The position of the drop guide 26 is changeable laterally from side to side (transverse displacement) and forwardly and rearwardly (longitudinal displacement) relative to the shear blade 10. Rotation of the longitudinal displacement knob 28 will result in the longitudinal displacement of the drop guide 26 and rotation of a second knob 30 will result in the transverse displacement of the drop guide. Rotation of the transverse displacement 30 knob rotates a shaft 32 and attached drive gear 34 (FIG. 2) which via an idler 36 rotates a driven gear 38 secured to a drive shaft 30 having a bore 40 which is square in cross section. The longitudinal displacement drop guide knob 28 is connected to a drive shaft 42 which also has a square bore 40. A hex surface 44 is defined on the shaft outer diameter which operates together with a spring 46 supported by a block 47 to define a detent to hold the shaft at a desired orientation. Also secured to the frame 12 is a block 50 supporting a spring 52 which is operatively associated with an enlarged fine toothed wheel 54 which is secured to the gob guide transverse displacement shaft 32 so that lateral adjustments can be made in fine increments.

As can be seen from FIG. 1, each of the drop guide drive shafts 39, 42 receives a driven shaft 60, 61 which extends rearwardly from the shear assembly housing 18 and which has a matching square cross section. The length of both the drive shafts and the driven shafts is selected so that they will be operatively associated throughout the displacement of the shear assembly housing 18.

Each drop guide assembly (FIG. 4) includes a base 62 having top flange 63 with a slide surface 64 on the top which supports and guides the lateral displacement of the gob drop guide support block 66. The slide includes a lateral groove 68 which receives a rack 70 secured to the bottom of the block 66 which is driven by a pinion 72 secured to the end of the drop guide transverse displacement driven shaft 60. The block has a laterally extending opening 74 which is partially defined by opposed inwardly extending shelves 76 for capturing the base flange 63.

The front threaded end of the drop guide longitudinal displacement shaft 61 (FIG. 6) has a threaded portion 80 which is coupled to a nut 81 carried by a cross link 82 which is connected to a pair of rods 84 suitably supported within the housing 18 for relative axial displacement. The base 62 of the drop guide is secured to the front end of these rods so that rotation of the control knob will advance or retract the drop guide. A notch 86 is defined near the front end of these rods (FIG. 7) and the front end of the drop guide transverse displacement driven shaft 60 has an annular groove 88 (FIG. 7) which are captured by the bottom surface of the connecting plate 90 and the cut out 80 when the plate is shifted to the latching position shown in FIG. 7. When the connecting plate is released by loosening a pair of screws 92 which pass through enlarged plate holes 94 and which are received by the drop guide base 62 and shifted to the right so that the plate becomes spaced from the lower left rod 84 and so that a large cut out 98 is adjacent and spaced from the lower right rod 84 and the cut out 89 is spaced from the shaft 60, the entire drop guide assembly can be pulled off the three rods and replaced with another assembly. The pinion 72 (FIG. 5) is secured with a screw 95 to the pinion shaft 60 and the front end of the shaft is supported by a bearing 96 which is press fit within a base opening. The rear opening 99 of the base 62 is large enough so that when the base is released it can be completely pulled from the pinion and supporting shaft.

I claim:
1. A shear mechanism for shearing discrete gobs from runners of molten glass comprising a longitudinally displaceable shear assembly housing including
   at least one shear,
   a corresponding number of gob drop guide assemblies each including
      a base portion having a front surface facing forwardly towards a sheared gob, and a top portion including a drop guide facing forwardly toward a sheared gob, said base portion including means for supporting said top portion for selected movement relative thereto, means for supporting each of said base portion for longitudinal displacement relative to said associated shear, said supporting means including a plurality of parallel rods extending forwardly through said base portion and each having a free end extending forwardly beyond the front surface of said base portion, catch means defined on the free end of said rods, and a latching plate, means for fastening said latching plate on said front surface of said base portion for movement between a securing position whereat said latching plate will become operatively associated with said catch means to secure said rods to said base portion and a release position whereat said base portion can be displaced forwardly and removed from said rods.

2. A shear mechanism according to claim 1, wherein the top portion of each of said drop guide assemblies includes a transversely extending rack and one of said rods supporting the associated base portion includes a pinion operatively engaging said rack, said base portion being selectively configured to permit forward displacement of said base portion to disengage said rack from said pinion as said base portion is removed from said rods.

3. A shear mechanism according to claim 2, wherein said plurality of rods includes said one rod supporting said pinion and a pair of axially displaceable rods, further comprising means for conjointly axially displacing said pair of axially displaceable rods.

* * * * *